July 6, 1948. E. HANSON 2,444,874
PACKING
Filed Oct. 9, 1944
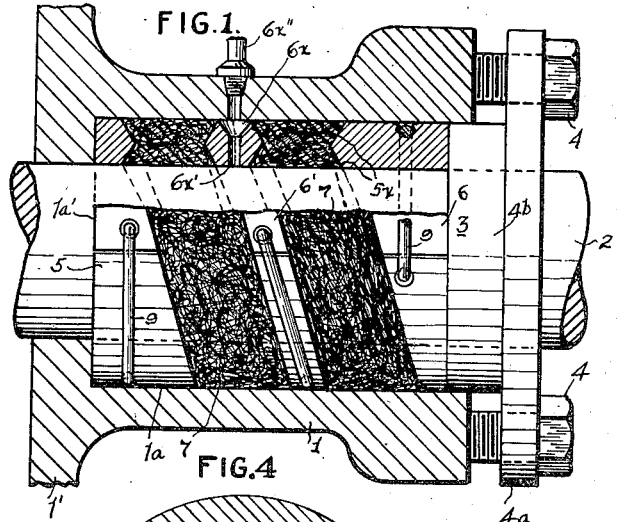
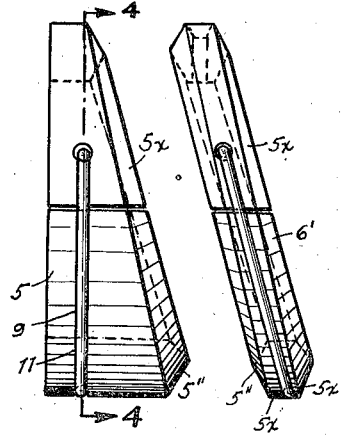
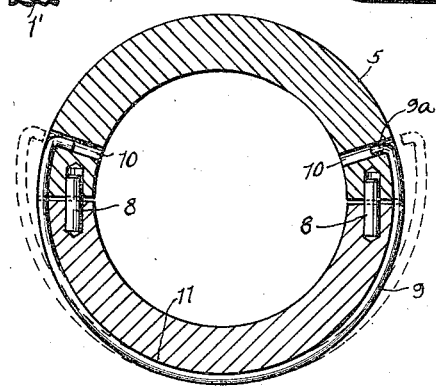
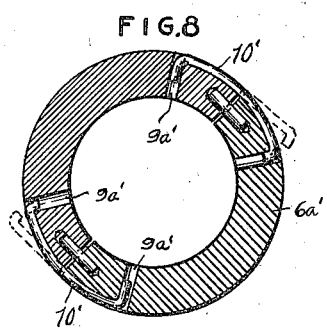
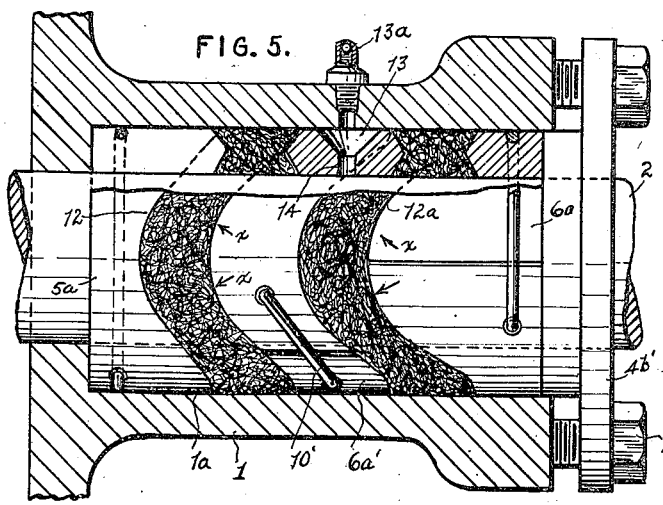
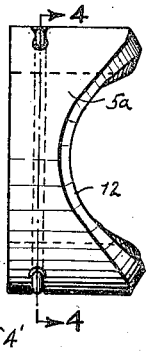
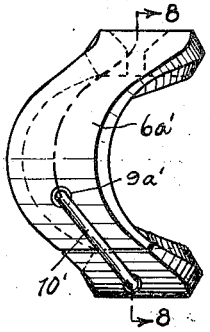
INVENTOR.
EDWARD HANSON
BY Geo. B. Tuttle
attorney Patented July 6, 1948

2,444,874

UNITED STATES PATENT OFFICE 2,444,874

PACKING

Edward Hanson, Cleveland, Ohio, assignor of one-tenth to George B. Pitts, Cleveland Heights, Ohio Application October 9, 1944, Serial No. 557,921

4 Claims. (Cl. 286—8)

This invention relates to a packing for a shaft to seal it with respect to a casing into which the shaft extends for operating one or more devices therein, the packing serving to prevent the escape of liquid or a gas from the casing. The invention is shown, for exemplification purposes, as applied to or within a hollow boss provided on the wall of the casing.

One object of the invention is to provide an improved packing for a shaft capable of ready assembly and disassembly without removal of the shaft or disconnection thereof from parts with which it is drivingly related.

Another object of the invention is to provide an improved shaft packing consisting of deformable material and sectional pressure annular members engaging therewith the sections of which are detachably connected together, whereby the packing may be removed and replaced without removing and/or displacing the shaft.

Another object of the invention is to provide an improved packing having means for supplying lubricant thereto and packing material having off-set portions, whereby rotation of the shaft serves to convey the lubricant to those surfaces of the material which engage the shaft, and pressure members for engaging the packing material and shaped to eliminate angular movement thereof and the packing material due to axial pressure on the packing.

Another object of the invention is to provide certain improvements in the construction of packing shown in my co-pending application Ser. No. 371,885, filed December 27, 1940, now Letters Patent No. 2,366,729, dated January 9, 1945.

Other objects of the invention will be apparent to those skilled in the art to which my invention relates from the following description taken in connection with the accompanying drawings, wherein Fig. 1 is a fragmentary section of a lubricated packing embodying my invention.

Figs. 2 and 3 are side elevations of one terminal pressure ring and the intermediate pressure ring, respectively.

Fig. 4 is a section on the line 4—4 of Fig. 2.

Fig. 5 is a view of a modified form of packing, parts being broken away.

Figs. 6 and 7 are side elevations of one terminal pressure ring and the intermediate pressure ring, respectively, for the packing shown in Fig. 5.

Fig. 8 is a section on the line 8—8 of Fig. 7.

In the drawings, referring particularly to Fig. 1, I indicates a hollow boss forming an integral part of a casing or housing I' which may contain gears, rotary pump elements or other operating parts to be driven by a shaft indicated at 2 and also a fluid in a gaseous or liquid state. 3 indicates as an entirety a packing seated in the enlarged portion of the bore or opening Ia through the boss I and serving to prevent leakage of the fluid contained in the housing I' therefrom around the shaft 2. The end wall of the boss I is formed with a plurality of inwardly extending threaded openings for cap screws 4, which extend through lugs 4a provided on a collar 4b and are threaded into the openings. As the collar 4b engages the outer end of the packing 3, it follows that the screwing in of the screws 4 operates to compress together the components of the packing between the collar 4b and shoulder Ia' at the inner end of the boss.

The packing 3 preferably consists of terminal members 5, 6, an intermediate member 6' and a section of deformable packing material 7 between the member 6' and each of the members 5, 6, but it will be readily observed that the intermediate member and one section of the material 7 may be omitted, so that the material 7 will be engaged by and compressed between the terminal members 5, 6.

The packing material may consist of any desirable deformable material or composition of materials, dependent upon the pressure and temperature existing in the casing I' as well as the maximum heat that may be generated by the frictional engagement of the shaft with the packing material. Each packing material 7 may consist of a section cut to a length to surround the shaft 2 with its opposite ends in end-to-end relation. The members 5, 6, 6', loosely fit the bore Ia of the boss I and have an internal diameter slightly greater than that of the shaft 2 to prevent frictional engagement therewith and permit the lubricant to spread thereover. The outer ends of the members 5, 6, are disposed in planes at right angles to their axes so that the outer end of the member 5 may rest against the shoulder Ia' and the outer end of the member 6 may be engaged by the inner end of the collar 4b. In the form of construction shown in Figs. 1, 2 and 3, the opposed faces of the members 5, 6, 6', are disposed at an angle oblique to the axis of the shaft 2, but substantially parallel to each other. Accordingly, when the members 5, 6, 6', and the sections of packing material 7 are assembled and the screws 4 are screwed inwardly, the sections of packing material will be compressed therebetween and maintained in an oblique relation to the shaft 2, so that one portion of each section of material 7 will overlap the diametrical portion thereof longitudinally of the shaft 2; however, each section of material 7 may be preshaped to fit the opposed faces of the members 5, 6, 6'. In the preferred form of construction, each face 5'' is shaped to provide outer and inner rearwardly inclined or beveled surfaces 5x the apex of which forms a circumferential rib between the outer and inner circumferential side walls of the member, so that when the members 5, 6, 6' are forced into final position the inner inclined surfaces 5x of the opposed faces 5'' will force the inner side portion of each section of packing material inwardly into sealing relation with the shaft 2 and the outer inclined surfaces 5x of the opposed faces 5'' will force the outer side portions of each section of packing material outwardly into sealing relation with the walls of the boss 1. As the lubricant is initially supplied to the surface of the shaft 2, as later set forth, and then conveyed to the inner surfaces of the packing materials, this compression of the inner portions thereof tends to prevent absorption of the lubricant by the outer portions of the packing materials, so that a large portion of the lubricant is retained in those portions of the packing materials adjacent to and in engagement with the shaft 2.

Each of the members 5, 6, 6', is of sectional construction, preferably consisting of two semi-circular sections, the end walls of which engage face-to-face in a plane extending diametrically of the shaft 2. As will be observed, this sectional construction provides for the ready assembly of the members 5, 6, 6', and materials 7 after the shaft 2 has been completely assembled in its supports and connected to the devices in the casing 1' and disassembly of the packing and replacement thereof without disconnection, displacement or removal of the shaft 2, thereby saving both labor and time in carrying out such operations.

By preference I provide dowel pins 8 between the sections of each member (see Fig. 4), whereby they are positioned with their faces 5'' in alinement, as shown in Figs. 2 and 3. The sections of each member 5, 6, 6', are connected together by a resilient curvalinearly shaped clip 9 (preferably formed from a section of wire) the opposite ends 9a of which are bent inwardly and project into openings 10 formed in the walls of one or related sections, dependent on the form of clip employed. In the form of construction shown in Figs. 1 to 6, inclusive, one section is formed with openings 10 adjacent its opposite ends and the clip 9 extends entirely around the other section and its ends 9a projected into the openings 10. In the form of construction of the member 6a' shown in Fig. 7 (which is a component part of the modified form of packing shown in Fig. 5), due to the shape thereof, the opposite ends of each section of this member are formed with openings 9a' and the inturned ends of a resilient clip 10' engage one opening in one section and the adjacent opening in the other section. Each section of each pressure member is formed with a groove 11 which is sufficiently deep to accommodate the clip within the outer surface of the related sections. By connecting the sections of each member together in the manner set forth, they may be assembled around the shaft 2 and then positioned in the bore of the boss 1 as a unit. Where the clip 10 is not employed each section may be separately positioned.

The intermediate member 6' is formed in its upper portion with a recess 6x to form a holder for a supply of a suitable lubricant and also formed with a duct 6x' which leads from the bottom of the recess 6x through the wall of the member 6', so that the lubricant is supplied to the shaft 2 and spreads over the surface of the latter as it rotates. The lubricant is supplied to the holder 6x through a suitable valve 6x'', preferably of the type which is closed by a spring operated element, as shown in Fig. 5, adapted to be pressed inwardly against the tension of the spring when a nozzle of a lubricant supply container engages therewith.

In the arrangement above described it will be noted that one side portion of the member 6' is diametrically related to a side portion of the packing material 7 in a plane at right angles to the axis of the shaft 2; that is, spaced portions of the packing 7 are off-set relative to each other longitudinally of the shaft so that one portion of the annulus 6' has an overlapping relation to a portion of the packing. Accordingly, by applying lubricant through this overlapping portion of the annulus 6' to the surface of the shaft 2, the latter as it rotates conveys the lubricant to the diametrically related portion of the packing material 7 and hence lubricates the engaging surfaces between the packing and shaft; also, one portion of one section of material 7 overlaps the diametrical portion of the other section of material 7, so that the lubricant supplied to one section of material will spread over the shaft and be conveyed to the other section of material, and as more lubricant is supplied to the shaft the continued rotation of the latter will cause the lubricant to flow or spread over the shaft to lubricate the entire inner surfaces of both the packing materials.

Referring to Figs. 5, 6 and 7, 5a, 6a, indicate the terminal pressure members of the packing, 6a' indicates the intermediate pressure member, 7' indicates the sections of deformable packing material between these members and 4b' indicates a collar which exerts pressure on the packing when the screws 4' are screwed inwardly. In this form of construction, provision is made for eliminating the danger of one or more of the pressure members being forced into relatively abnormal positions and displacing the packing materials, or either thereof, so that portions of these materials do not engage the shaft 2 or such engagement is non-uniform throughout their circumferences. Accordingly, the faces of the members 5a, 6a and 6a' are shaped to exert the pressure, incident to screwing in of the screws 4', laterally in opposite directions relative to the axis of the shaft 2, as diametrical portions of the faces of the members 5a, 6a, 6a' extend rearwardly (that is, toward the collar 4b') relative to their intermediate portions. In the preferred form of construction the inner face of the inner terminal pressure member 5a is of concave shape from one side thereof to its opposite diametrical side, as shown at 12, and that the inner face of the outer terminal member 6a is of convex shape from one side thereof to its opposite diametric side, as shown at 12a, whereas the opposite faces of the intermediate member 6a' are complementary to the faces 12, 12a, of the members 5a, 6a, respectively, to provide for the assembly as shown. In this arrangement, the pressure exerted by the collar 4b', when the screws 4' are screwed in, effects a substantially equal pressure laterally relative to the axis of the shaft 2, as indicated by the arrows x, so that danger of the parts of the packing being forced into relative abnormal positions angularly of the shaft 2 is avoided. As shown, the members 5a, 6a, 6a', are formed in sections and removably connected in the manner already set forth and the faces thereof which engage the sections of packing are provided with reversely inclined surfaces similarly to the faces 5x shown in Figs. 1, 2 and 3. By preference, the sections of each member 5a, 6a, 6a', are constructed so as to dispose their related end walls in a different position angularly of the shaft 2 relative to the related end walls of the other members, respectively; that is, as shown in Fig. 5, the related end walls of the sections which form the member 5a, are in a vertical plane cutting the axis of the shaft 2 and the related end walls of the sections which form the member 6a, are in a horizontal plane cutting the axis of the shaft 2, whereas the related end walls of the sections which form the member 6a' are disposed in a plane oblique to the axis of the shaft 2.

Lubricant is initially supplied to a recess 13 formed in the upper portion of the members 6a' by a suitable valve 13a and flows through a duct 14 to the shaft 2 for spreading thereon and between the inner surfaces of the packing materials 7' and shaft.

The sections forming the members 5, 6, 6', (Fig. 1) and 5a, 6a, 6a' (Fig. 5) are formed of substantially rigid material, such as bronze, Bakelite, rubber composition and the like.

Where the packing is employed for sealing a shaft which operates a pump for a fluid, such as water, the pressure on the packing material may be sufficiently relieved to permit slight leakage of the fluid into the packing, in which case the fluid may serve as a lubricant for the packing material. In this application of the invention the lubricant supply means may be omitted.

While my invention is shown applied to a shaft within a boss and the packing material is subjected to pressure to prevent the escape of a liquid or a gas from a housing, it is equally adapted for employment where such pressure is not present, that is, between a shaft and a tubular member through which the shaft extends to prevent the escape of a liquid lubricant or a gas along the shaft from one side of the packing to the other side thereof.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. In a packing, the combination with a housing having a boss and a driven shaft extending through the boss, of a packing mounted in said boss in surrounding relation to said shaft, said packing comprising a plurality of substantially rigid annular members having opposed end walls diametrical portions of which overlap the shaft longitudinally thereof in opposite directions, and deformable packing material interposed between said members, the overlapping diametrical portions of each member being in alinement, longitudinally of said shaft, with the intermediate diametrical portions of the adjacent member, means for supplying lubricant to said shaft, and means for applying pressure axially of said shaft to the outer annular member for deforming said packing material and forcing the latter into sealing engagement with the walls of the boss and said shaft, whereby the arrangement of the packing material in conjunction with the rotation of the shaft provides a wiping action for distributing the lubricant over the surfaces of the latter.

2. In a packing, the combination with a housing having a boss and a driven shaft extending through the boss, of a packing mounted in the boss in surrounding relation to said shaft, said packing comprising outer members, an intermediate member and deformable packing material interposed between the opposite end walls of said intermediate member and the opposed end walls of said outer members, each end wall of said intermediate member and the opposed end wall of each outer member having diametrical portions which overlap said shaft longitudinal thereof in the same direction relative to its intermediate diametrical portions, said overlapping portions of each member being in alinement with the diametrical intermediate portions of the adjacent member, means for applying axial pressure to said members for deforming the packing materials and forcing said packing materials into sealing engagement with the walls of said boss and said shaft, whereby the arrangement of the packing materials in conjunction with the rotation of said shaft provides a wiping action for distributing the lubricant over the surfaces of the latter.

3. In a packing, the combination with a housing having a boss and a driven shaft extending through the boss, of a packing mounted in said boss in surrounding relation to said shaft, said packing comprising substantially rigid terminating annular members, an intermediate substantially rigid annular member and deformable packing material interposed between each terminal member and said intermediate member, the inner end wall of one terminating member being of concave shape diametrically thereof, the inner end wall of the other terminating member being of convex shape diametrically thereof and the opposite end walls of said intermediate member being substantially complementary to the inner end walls of said terminating members, said end walls of said members being substantially parallel one to another and disposed about spaced imaginary centers intersected by the axis of said shaft, means for supplying lubricant to said shaft, and means engaging one of said terminating members for deforming said packing materials and forcing the latter into sealing engagement with the walls of the boss and said shaft.

4. In a packing, the combination with a housing having a boss and a driven shaft extending through the boss, of a packing mounted in said boss in surrounding relation to said shaft, said packing comprising a plurality of substantially rigid annular members having opposed end walls circumferentially spaced portions of which overlap the shaft longitudinally thereof in opposite directions and deformable packing material interposed between said members, the overlapping circumferentially spaced portions of each member being in alinement, longitudinally of said shaft, with the intermediate portions of the adjacent member, means for supplying lubricant to said shaft and means for applying pressure axially of said shaft to the outer annular member for deforming said packing material and forcing the latter into sealing engagement with the walls of the boss and said shaft, whereby the arrangement of the packing material in conjunction with the rotation of the shaft provides a wiping action for distributing the lubricant over the surfaces of the latter.

EDWARD HANSON.

REFERENCES CITED

The following references are of record in the file of this patent:

UNITED STATES PATENTS

| Number | Name | Date |
|---|---|---|
| 528,773 | Ellis | Nov. 6, 1894 |
| 561,794 | Kelley | June 9, 1896 |
| 796,658 | Katzenstein | Aug. 8, 1905 |
| 993,660 | Driggs | May 30, 1911 |
| 1,189,905 | Backe | July 4, 1916 |
| 1,208,454 | Baumeyer | Dec. 12, 1916 |
| 1,349,060 | Gall et al. | Aug. 10, 1920 |
| 1,889,828 | Gehrman | Dec. 6, 1932 |
| 2,366,729 | Hanson | Jan. 9, 1945 |

FOREIGN PATENTS

| Number | Country | Date |
|---|---|---|
| 690,313 | Germany | 1940 |

OTHER REFERENCES

"What's New in Plant Equipment—Packings"; "Power" for July 1943, page 126 (488); copy in 286-5 (2), Div. 52.